United States Patent
Flamini et al.

(10) Patent No.: US 12,425,355 B1
(45) Date of Patent: Sep. 23, 2025

(54) ROUTING NETWORK TRAFFIC IN CLOS FABRICS

(71) Applicant: Amazon Technologies, Inc., Seattle, WA (US)

(72) Inventors: David Alonso Flamini, Dublin (IE); Patricio Giecco, Upland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 66 days.

(21) Appl. No.: 18/387,390

(22) Filed: Nov. 6, 2023

(51) Int. Cl.
*G06F 13/00* (2006.01)
*H04L 49/1515* (2022.01)

(52) U.S. Cl.
CPC .................. *H04L 49/1515* (2013.01)

(58) Field of Classification Search
CPC ............................ H04L 49/1515; H04L 49/15
USPC .......................... 709/238, 224, 201; 718/105
See application file for complete search history.

(56) References Cited

U.S. PATENT DOCUMENTS

| | | | |
|---|---|---|---|
| 11,671,330 B2 * | 6/2023 | Wong | H04L 41/12 398/45 |
| 12,212,495 B2 * | 1/2025 | Vegesna | H04L 12/4633 |
| 2021/0297350 A1 * | 9/2021 | Vegesna | H04L 47/12 |
| 2023/0052529 A1 * | 2/2023 | Wong | H04L 41/0826 |

* cited by examiner

*Primary Examiner* — Kenneth R Coulter
(74) *Attorney, Agent, or Firm* — Klarquist Sparkman, LLP

(57) ABSTRACT

A computer-networking system is described to leverage traffic splits naturally occurring in Clos fabrics along the path to a top tier of the fabric. Using the traffic splits, a result similar to or the same as WECMP can be implemented but using less network-device overhead. The system introduces another level of indirection abstracting sets of outgoing next hops across tier 1 devices in the fabric and leveraging ECMP or WECMP to manage the capacity. Incoming traffic flows are split as they get forwarded across the fabric due to the fabric's topology, routing design, and/or the pattern of external connections. These traffic splits are leveraged in creating forwarding tables for the network devices, thereby making the scaling model for WECMP a function of the outgoing external connections of the fabric rather than the number of traffic flow destinations in the network domain.

19 Claims, 8 Drawing Sheets

ROUTING NETWORK TRAFFIC IN CLOS FABRICS

BACKGROUND

Equal-Cost Multipath (ECMP) is a network routing strategy that can be used in to distribute traffic across multiple equal-cost paths to a destination host or network. ECMP achieves network load balancing by transmitting packets along multiple paths of equal cost simultaneously in order to improve network performance.

Weighted ECMP (WECMP) is an extension of ECMP and allows administrators to assign weights or priorities to each of the equal-cost paths. These weights determine the proportion of traffic that each path should carry. Paths with higher weights receive more traffic, which allows network administrators to control the distribution of traffic more precisely and to achieve specific traffic engineering goals. For example, by assigning appropriate weights, the network administrator can ensure that preferred paths carry a larger share of the traffic, while still providing a desired level of load balancing across the other paths.

In large networks, WECMP does not scale well, as the weighting adds entries to tables in network routers. As the network size increases, the tables may be overloaded by the WECMP entries.

DETAILED DESCRIPTION

Implementation of WECMP is limited in large networks due to available resources on network devices. More specifically, the weighting is created by extra entries in the forwarding tables of the network devices. However, the forwarding tables are limited in size and in larger networks the forwarding tables can become too large for an available memory space. A system is described to leverage traffic splits naturally occurring in Clos fabrics along the path to a top tier of the fabric. Using the traffic splits, a result similar to or the same as WECMP can be implemented but using less network-device overhead. The system minimizes the use of resources in the network hardware while delivering a comparable granularity per traffic flow (identified by its Internet Protocol (IP) destination) as traditional methods. The system introduces another level of indirection by abstracting sets of outgoing next hops across tier 1 devices in the fabric and leveraging ECMP or WECMP to manage the capacity. Incoming traffic flows are split as they are forwarded across the fabric (e.g., leveraging ECMP) due to the fabric's topology, routing design, and/or the pattern of external connections. These traffic splits are leveraged in creating forwarding tables for the network devices, thereby making the model for WECMP a function of the outgoing external connections of the fabric rather than the number of traffic flow destinations in the network domain.

Figure 1:
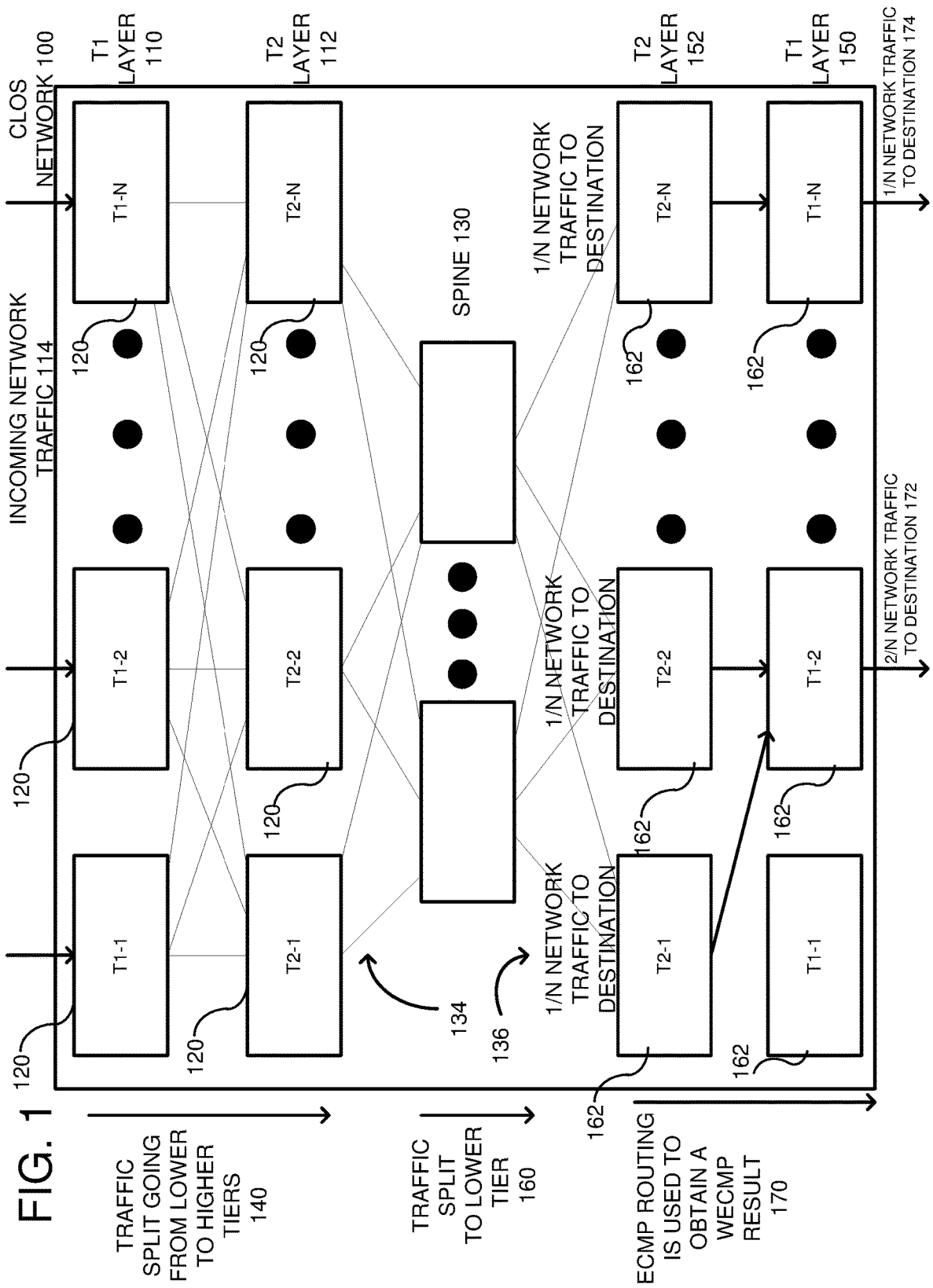
FIG. 1 is an example Clos network that leverages network traffic splitting in programming network devices for a desired weighted routing result.

FIG. 1 shows an example Clos network 100 that comprises multiple tiers including tier 1 layer 110 and tier 2 layer 112. The tiers are shown having a plurality of network devices, shown generically as 120, wherein the tiers 110, 112 include N network devices in coupled in parallel to an adjacent layer (where N is any integer number). Generally, the tier 1 layer devices 110 are coupled to client devices, such as through additional networking devices (e.g., a Top of Rack switch) or a separate network (e.g., Internet (not shown)). Additionally, the tier 1 devices are shown receiving incoming network traffic 114. Although two tiers 110, 112, are shown, the Clos network 100 can have additional tiers, such as T3, T4, etc. Each network device 120 in T1 is connected to every network device in T2. Additionally, all of the network devices in a tier are coupled in parallel. The T2 devices are coupled to spine network devices 130. A group of network devices on one side of the spine 130 is called a brick 134. In Clos networks, such as Clos network 100, as the incoming traffic 114 moves in the direction indicated by arrow 140, the traffic is split between T2 devices using ECMP programmed into the network devices. In one example, the network traffic 114 is equally split between the T2 layer devices 112, but other splitting proportions can be used. Once at the spine 130, the network traffic 114 can either be reflected back towards the tier 1 layer devices 110 or it can be forwarded to another brick 136. Although only two bricks are shown, additional bricks can be added.

Brick 136 has a similar structure as brick 134 and includes a T1 layer 150 and a T2 layer 152. The network devices in the brick 136 are indicated at 162. However, instead of showing all of the interconnections between T2 152 and T1 150, the arrows only indicate traffic flow to a particular destination. As the network traffic 114 is transmitted from the spine 130 to the brick 136, it can be split (e.g., evenly), as indicated at 160. As a result of the splitting 160, each network device 162 at T2 receives 1/N network traffic to a particular destination. Additionally, each network device at T2 can be programmed uniquely using ECMP to obtain a WECMP like result. For example, T2-1 and T2-2 can both transmit traffic to T1-2 and the result is a weighted output 172 shown as 2/N, whereas the traffic transmitted from T2-N to T1-N results in only 1/N of the traffic, as shown at 174. Thus, the splitting 160 of the network traffic can be leveraged to allow ECMP to be used at layer T2 with a weighted result. The splitting can be equal splitting or a predetermined amount of splitting. As a result, network resources are preserved as weighting is accomplished without additional entries in the memory of the T2 network devices. Additionally, although the programming is shown at the T2 layer 152 to obtain a WECMP like result, the programming can occur at a higher layer, such as the spine layer 130. Still further, although two tiers are shown in each brick 134, 136, there can be any number of tiers. In any event, if network traffic to a particular destination (or having a particular prefix or any other distinguishing characteristics) is considered a sub-flow, then at any layer, as the network traffic moves from a higher layer to a lower layer, the network devices can be programmed using ECMP to selectively merge the sub-flows (or keep them isolated by forwarding them to different network devices or by using further encapsulation, separate forwarding tables, or other particular means) at the next lower layer, which results in WECMP-like outputs, but without additional entries in the forwarding tables like WECMP.

Figure 2:
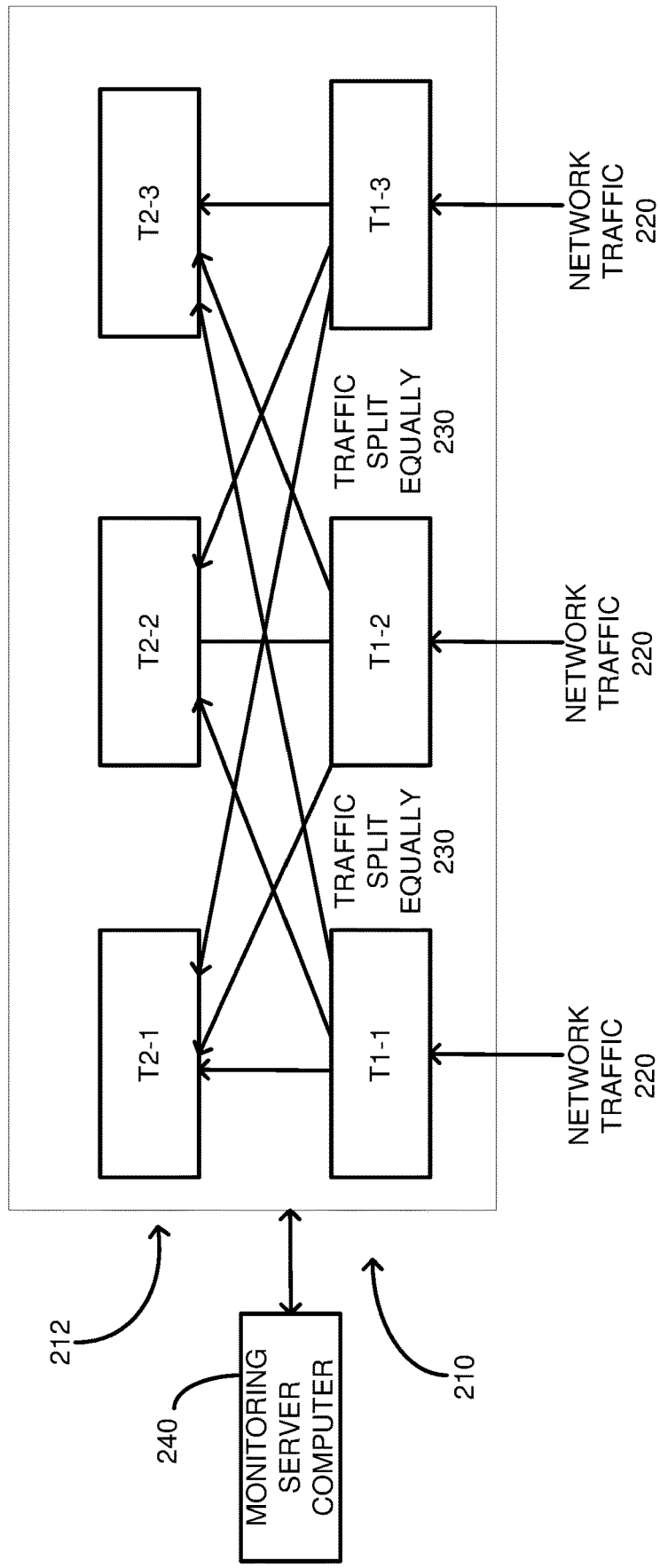
FIG. 2 is a detailed example of how traffic is split as the network traffic moves from a lower tier to a higher tier in the Clos network, with a monitoring server computer for detecting an amount of splitting.
Figure 3:
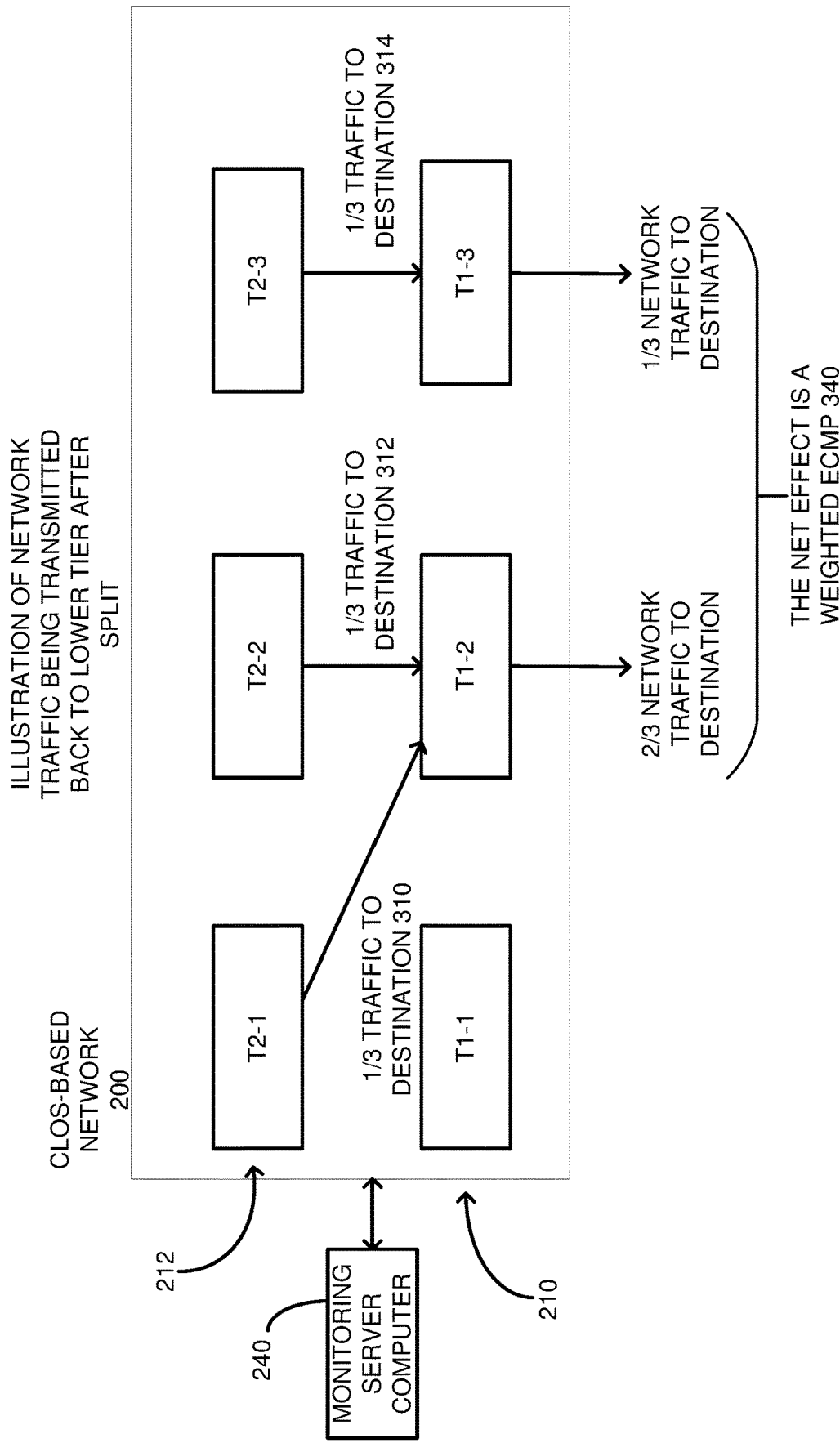
FIG. 3 is a detailed example of how the network traffic is routed from the higher tier to the lower tier in the Clos network of FIG. 2.

FIG. 2 shows another example of a Clos-based network 200 with traffic being transmitted from a lower layer to a higher layer. FIG. 3 shows the same Clos-based network 200 with the traffic reflected from the higher layer to the lower layer. First, starting with FIG. 2, the Clos-based network 200 includes a T1 layer 210 and a T2 layer 212, with each layer having a plurality of network devices coupled in parallel and with each T1 network device coupled to each T2 network device. For simplicity, each of the T1 and the T2 layers are shown with only 3 network devices and without a spine layer. Network traffic enters the Clos-based network 200 from client devices as indicated at 220 and is transmitted to the T2 layer 212. According to an ECMP strategy programmed into each of the T1 layer 210 devices, the network traffic 220 is split statistically equally (e.g., approximately equally, but relates to sampling timeframe), as shown at 230. Thus, each network device at T2 layer 212 receives approximately ⅓ of the network traffic. In some embodiments, the T1 layer devices can split traffic differently. In such a case, a monitoring server computer 240 can receive network traffic information from the T1 devices indicating the splitting that is occurring. In either case, the server computer 240 or a different server computer can use the amount of splitting to generate forwarding table information for the devices in the network 200 and thereby obtain a weighted routed output without the overhead of prior WECMP solutions. In some cases, a link or a network device can become problematic. In such a case, the monitoring server computer 240 can detect the adjusted traffic flows due to the problematic device. For example, if network device T2-2 is taken offline, then network traffic previously going to T2-2 is re-directed to T2-1 and T2-3. The monitoring server computer 240 can detect the new traffic splitting and the network devices can be re-programmed (as the traffic is reflected back down to the lower tier) according to the revised splitting. As a result, problems in the network can be addressed and the ECMP programming can be adjusted dynamically to maintain the desired weighted output. In still another embodiment, instead of measuring traffic directly, the monitoring server computer 240 can have access to topology information and, if a network device goes offline, the monitoring server computer can infer how the traffic is re-routed and then can make programming adjustments accordingly.

FIG. 3 illustrates the Clos-based network 200 of FIG. 2 with only network traffic being shown for a single IP destination for simplicity. In this case, T2-1 is programmed using ECMP to transmit the network traffic for the particular destination to T1-2 as indicated at 310. As a result of the equal splitting of network traffic, as described in FIG. 2, the amount of network traffic from T2-1 to T1-2 is about ⅓ of the total network traffic to that destination. Likewise, T2-2 is programmed using ECMP to transmit its network traffic to the same destination IP address to T1-2 and also transmits about ⅓ of the total traffic as indicated at 312. The result is that the tier 1 device, T1-2, has merged traffic from multiple tier 2 network devices. Thus, splitting of network traffic occurs as traffic goes up in tiers, and merging occurs as network traffic goes back down the tiers. How traffic is merged can also be monitored and considered in the programming of the network devices. By contrast, T2-3 transmits ⅓ of the total traffic to the same IP destination to T1-3, as indicated at 314. The resultant output from the Clos-based network 200 is shown at 340 as a WECMP-like output. However, the forwarding tables in the T2 layer 212 only require a single entry to direct the traffic to the T1 layer 210. Traditionally, to obtain a similar WECMP output 340, each of the T2 layer 212 network devices would have identical forwarding tables with additional entries to the T1-2 device so that more network traffic is directed to the heavier weighted T1 network device. However, by leveraging the knowledge of splitting occurring as the network traffic reflects off of the T2 layer 212, less entries are needed for the forwarding tables, but with equal results. Additionally, it should be noted that the T2 layer 212 network devices are programmed differently instead of having the same forwarding tables. For example, for the same destination IP address, T2-2 transmits to T1-2, whereas T2-3 transmits to T1-3. Thus, the forwarding tables for T2-2 and T2-3 are different, which also allows for the WECMP result. In some embodiments, the T1 layer 210 network devices can also be programmed differently from each other to forward traffic to next hops using ECMP but having a WECMP result (without WECMP overhead). The monitoring server computer 240 can also be used to monitor the outputs of the Clos-based network 200 to determine if the output weighting is as desired. If not, additional network traffic from T2 network devices can be merged or, alternatively, one or more network devices can be removed from contributing to a sub-flow. Thus, the monitoring server computer 240 can be used as a control/feedback loop to ensure that the weighted ECMP output is as desired. In any case, network traffic is split using ECMP as it proceeds from the lower tiers to the higher tiers and the weighting effect is programmed using ECMP to merge traffic as the network traffic goes from the top tier to the lower tier.

Figure 4:
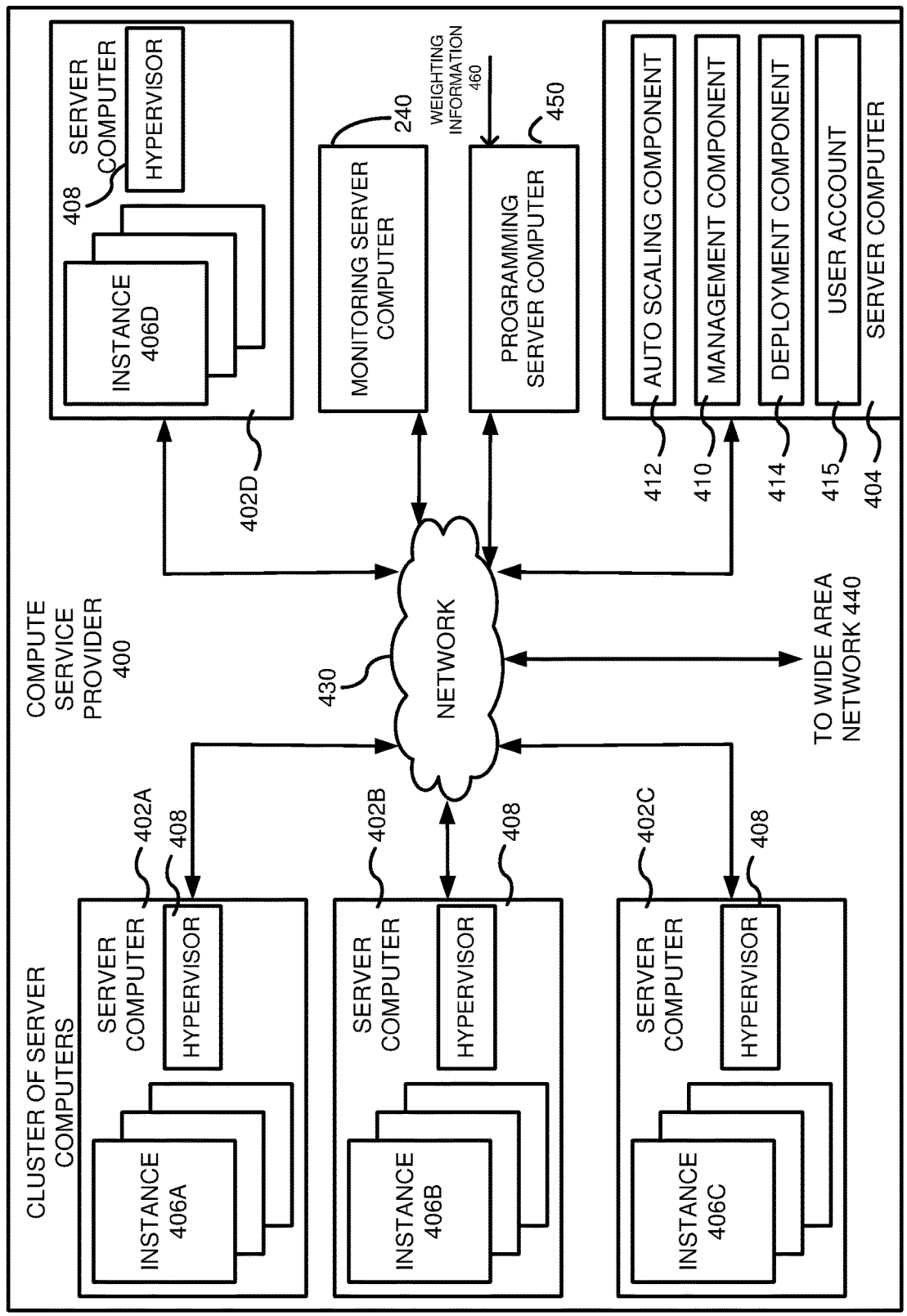
FIG. 4 is an example system diagram showing a plurality of virtual machine instances running in the multi-tenant environment, with the monitoring server operating therein.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to customers through a network, for example allowing customers to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows customers to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the customer, the hardware associated with the virtual computing devices can be scaled up or down depending upon the resources the customer requires. Customers can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by customers of the cloud provider network, which may be provisioned in customer accounts.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408 or another type of program configured to enable the execution of multiple instances 406 on a single server. Additionally, each of the instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 430 can be utilized to interconnect the server computers 402A-402D and the server computer 404. The network 430 can be a local area network (LAN) and can be connected to a Wide Area Network (WAN) 440 so that end customers can access the compute service provider 400. The network 430 can also include the Clos network 100 (FIG. 1). It should be appreciated that the network topology illustrated in FIG. 4 has been simplified and that many more networks and networking devices can be utilized to interconnect the various computing systems disclosed herein.

The monitoring server computer 240 can execute on one of the server computers 402 or can be one or more instances 406 executing on the server computers 402. As stated above, the monitoring server computer 240 can receive splitting information from the network 430. Additionally, a separate server computer 450 can use the splitting information to determine forwarding tables in the network devices and to program the network devices with the appropriate forwarding tables to effectuate the WECMP routing scheme described above. To calculate the forwarding tables, the server computer 450 can input, at 460, a desired weighting information associated with a desired weighted output (see weighted output 340, FIG. 3). The calculated forwarding tables can then be programmed into the FIB 555 (FIG. 5).

Figure 5:
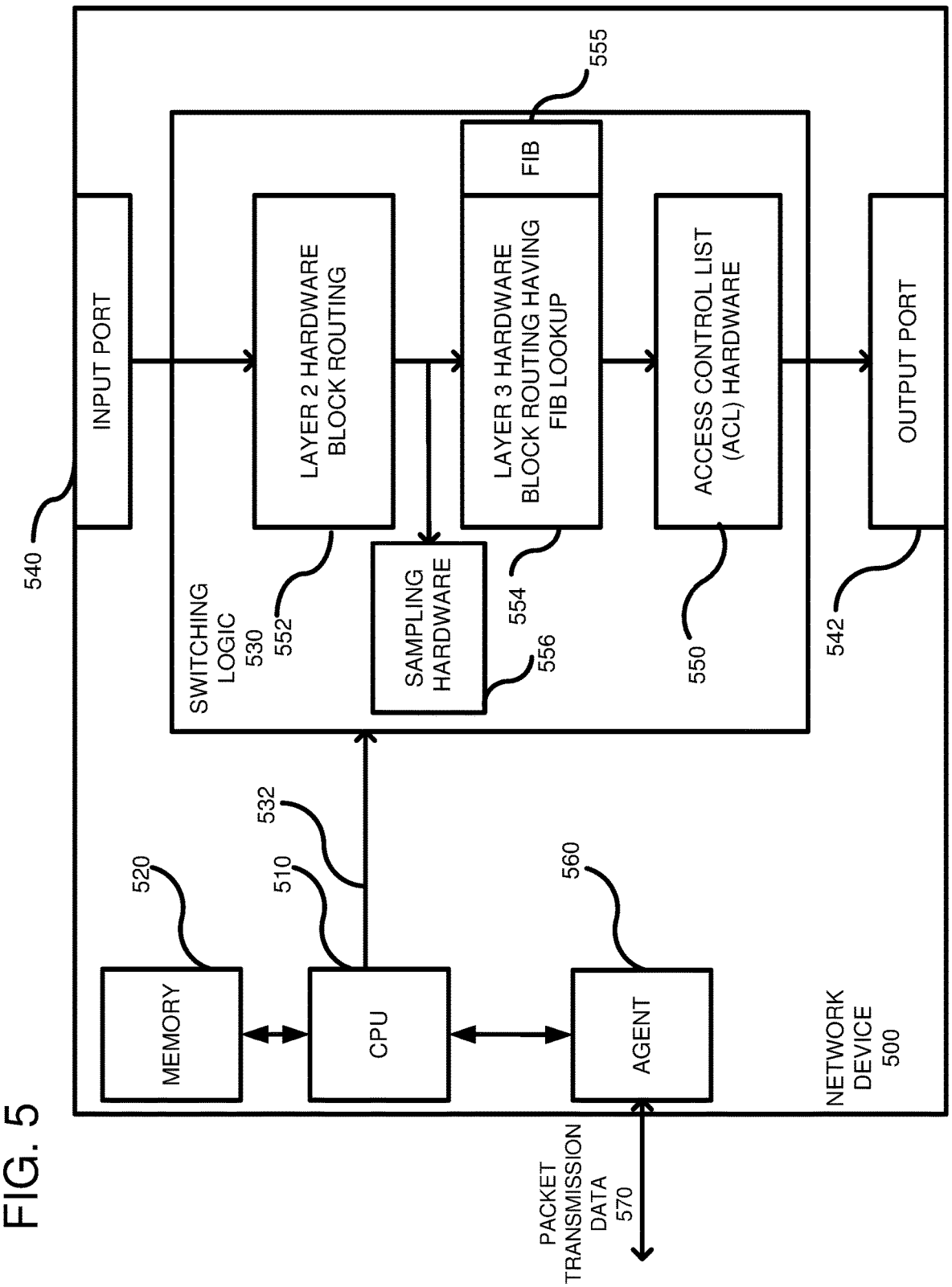
FIG. 5 is an example network device that can supply information regarding the splitting data obtained by the monitoring server of FIG. 2.

FIG. 5 shows a detailed example of an embodiment of the network device 500. Network device 500 is a switch that routes packets to a next hop in the network using a destination IP address. A CPU 510 is coupled to a memory 520 and to switching logic 530 through a bus 532 (PCIe or other protocols and bus types can be used). The switching logic 530 is positioned between an input port 540 and an output port 542, which are typically adapted to receive network cables, such as Ethernet cables. Although only one input port 540 and one output port 542 are shown, typically there are multiple ports (also called interfaces) on a network device. The switching logic 530 can be a single ASIC integrated circuit or divided into multiple integrated circuits. The switching logic 530 can include multiple different hardware logic blocks including a layer 2 hardware block 552, a layer 3 hardware block 554, and an Access Control List (ACL) hardware block 550. The layer 2 hardware block 552 relates to an Ethernet layer and can forward packets based on MAC tables. The layer 2 lookup ensures that an incoming packet's MAC address equals the MAC address of the network device 500. If so, then the packet can proceed onto the layer 3 hardware. If not, then the layer 3 lookup does not occur. The layer 3 hardware block 554 relates to forwarding based on a longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a forwarding table, also called a Forwarding Information Base (FIB) 555, which includes destination addresses (e.g., prefixes) for packets being transmitted through the switching logic and associated ports for forwarding the packets. The network device 500 can run routing protocols, such as an Open Shortest Path First (OSPF) or a Routing Information Protocol (RIP), to communicate with other Layer 3 switches or routers. The routing tables are used to lookup the route for an incoming packet. The ACL block 550 relates to permissions and can include rules whether to drop packets. The different hardware blocks can be coupled in series and additional hardware blocks can be added based on the design. Packets pass from the input port 540 to the output port in accordance with the configuration of the hardware logic blocks 550, 552, 554, which are considered a switching pipeline. The input port 540, output port 542 and switching logic 530 can be considered a data plane or forwarding plane of the network device 500. By contrast, the CPU 510, memory 520, and an agent 560 are considered part of a control plane. Sampling hardware 556 can be provided anywhere in the switching pipeline and periodically (fixed time intervals) or randomly samples buffers in the switching logic 530 or packets passing through the network device 500. The sampling hardware 556 is shown in between the layer 2 and layer 3 hardware but can be situated at other locations. As shown, the agent 560 can execute on the CPU 510 and can be used to receive sampled packets from the sampling hardware 556. The sampling hardware 556 can collect the packet transmission data and pass it to the agent 560, which can, in turn, transmit the information to the monitoring server computer 240, as indicated at 570. The agent 560 can further add a timestamp to the information, if desired. Although this embodiment shows the sampling hardware 556, the function of the sampling hardware can be performed in software, such as within the agent 560. The packet transmission data 570 can include splitting information indicating an amount of splitting occurring through the network switch for traffic being transmitted to next hops. The network devices described herein can be switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points, for example. A network device can also include any device used for forwarding packet data.

Figure 6:
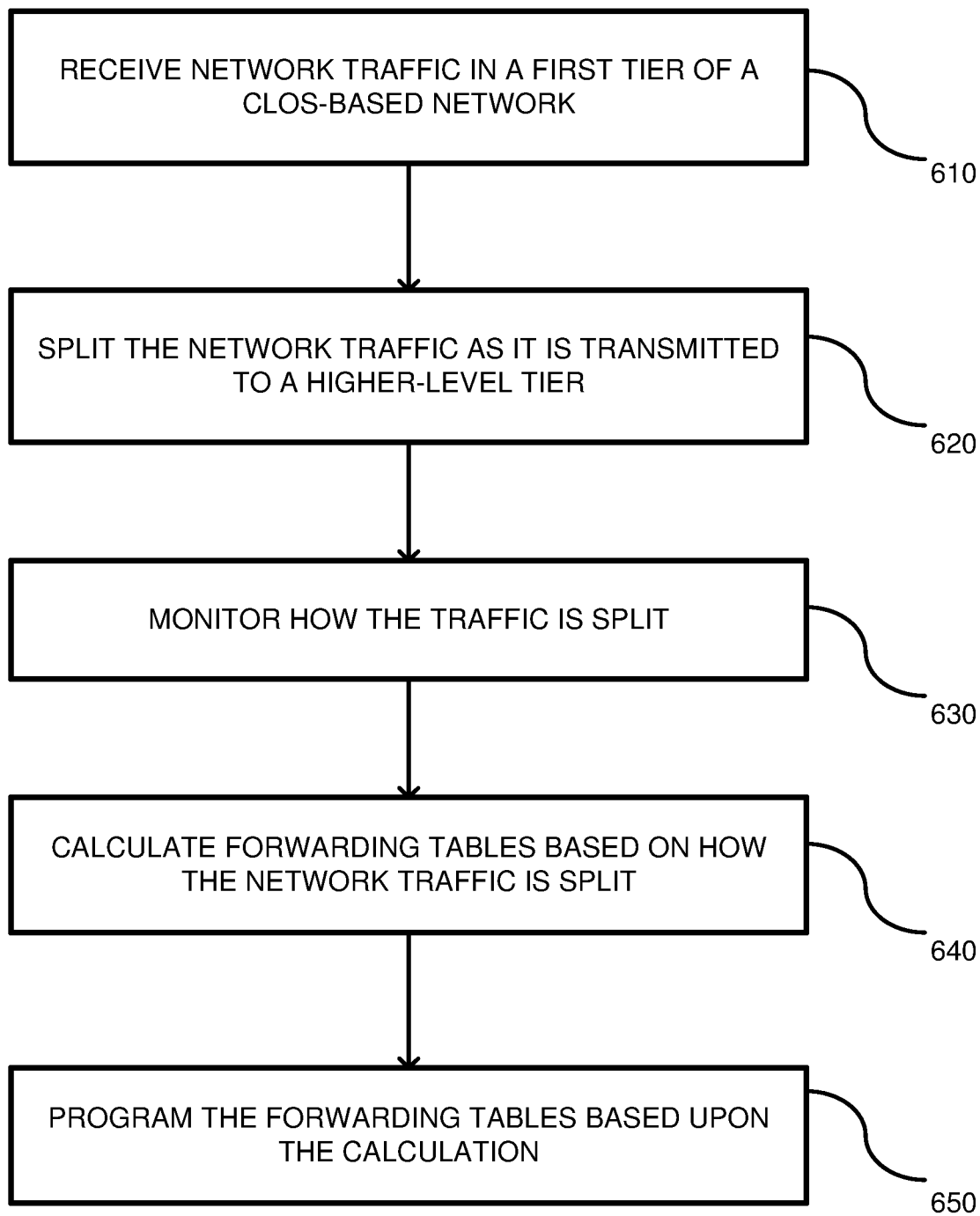
FIG. 6 is a flowchart according to one embodiment for routing network traffic in a Clos network.

FIG. 6 is a flowchart according to one embodiment for routing network traffic in a Clos network. In process block 610, the network traffic is received in a first tier of the Clos-based network. For example, in FIG. 1, the network traffic from client computer devices (not shown) can be received in T1 (tier 1) layer 110. In process block 620, the network traffic is split as it is transmitted from the lower tier to a higher tier in the network. For example, in FIG. 1, the network traffic can be split by the T1 network devices in the T1 layer 110 as the network traffic is transmitted to the network devices in the T2 layer 112. In one example, the T1 devices can be programmed using ECMP to split the traffic equally between the T2 network devices. In process block 630, a monitor can be used to determine a percentage of splitting that occurred. For example, in FIG. 2, the monitoring server computer 240 can be used to monitor network traffic passing between the network devices. The monitoring server computer 240 can receive the information directly from the network devices, such as is shown at 570 in FIG. 5. In process block 640, a forwarding table is calculated based on how the traffic is split. For example, in FIG. 4, the programming server computer 450 can use the splitting information received from the monitoring server computer 240 and can calculate forwarding tables in the network devices to obtain a desired weighted outcome. In process block 650, the forwarding tables can be programmed based upon the calculation. For example, in FIG. 4, the programming server computer 450 can determine the forwarding tables and program the network devices by transmitting the forwarding tables to the FIB 555 (FIG. 5).

Figure 7:
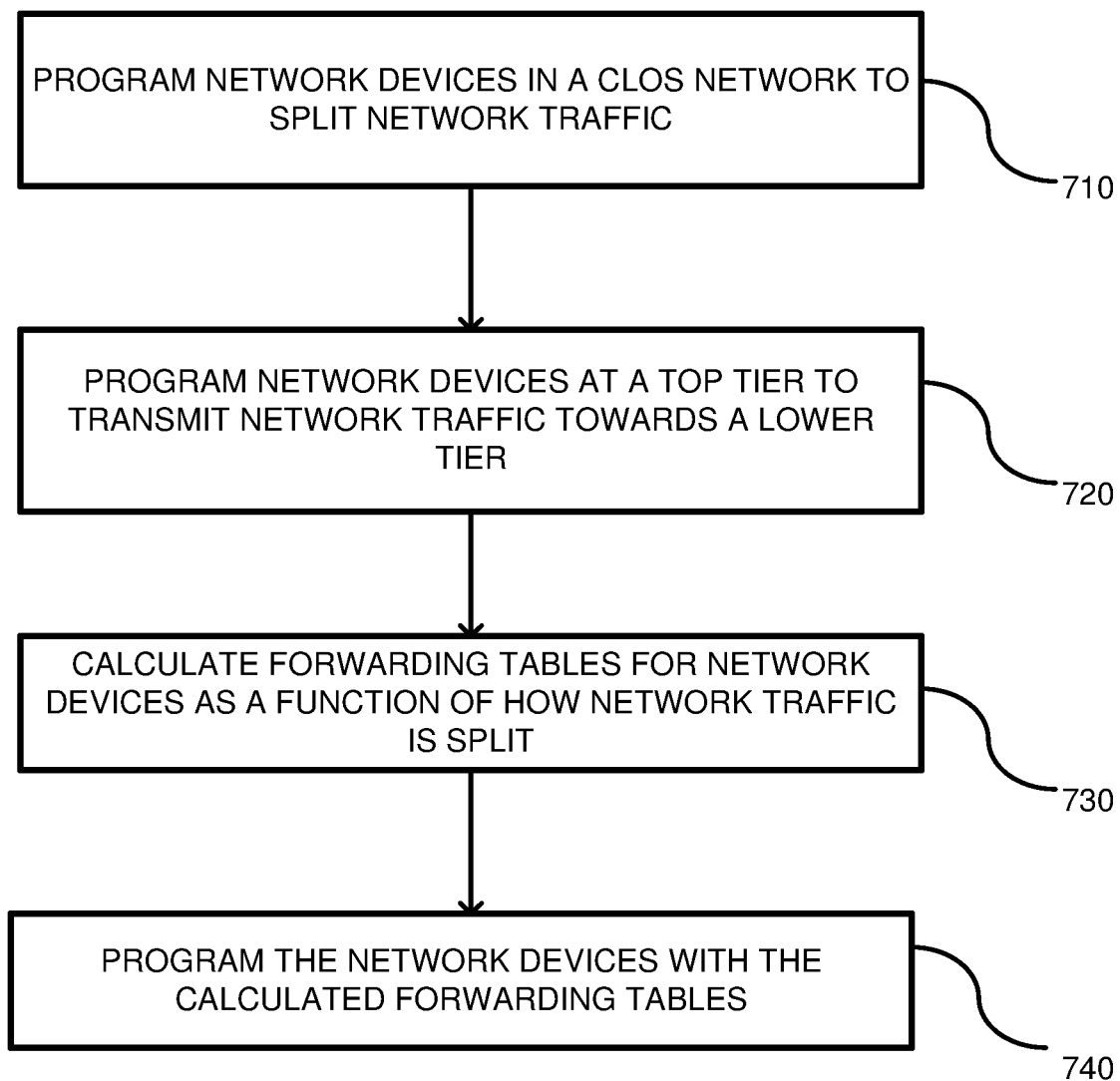
FIG. 7 is a flowchart according to another embodiment for routing network traffic in a Clos network.

FIG. 7 is a flowchart according to another embodiment for programming network devices in a Clos network. In process block 710, the network devices in the Clos network are programmed to split network traffic. In one example, the split can be an equal split. For example, in FIG. 2 the network traffic 220 is split at 230 as it passes from tier 1 210 to tier 2 212. In process block 720, the network devices at the top tier are programmed to transmit network traffic towards a lower tier. For example, in FIG. 1, the top tier is the spine 130 and the network devices in the spine are programmed to transmit network traffic towards the T2 layer 152. Alternatively, in FIG. 3, the network devices in the top tier T2 212 transmit network traffic towards the lower tier T1 210. The programming can be ECMP and allow for an equal split. In process block 730, the forwarding tables for network devices in the Clos network are calculated as a function of how the network traffic is split. In a typical example, the natural splitting of network traffic equally in the Clos network is leveraged. In one example, such a calculation can be determined by the programming server computer 450 (FIG. 4). Other parameters can be used in the calculation, such as using a number of network devices in at least one of the tiers and a number of tiers in the multi-tiered Clos-based network. In process block 740, the network devices can be programmed with the calculated forwarding tables. For example, the programming server computer 450 can program the FIB 555 in the network device 500 (FIG. 5).

Figure 8:
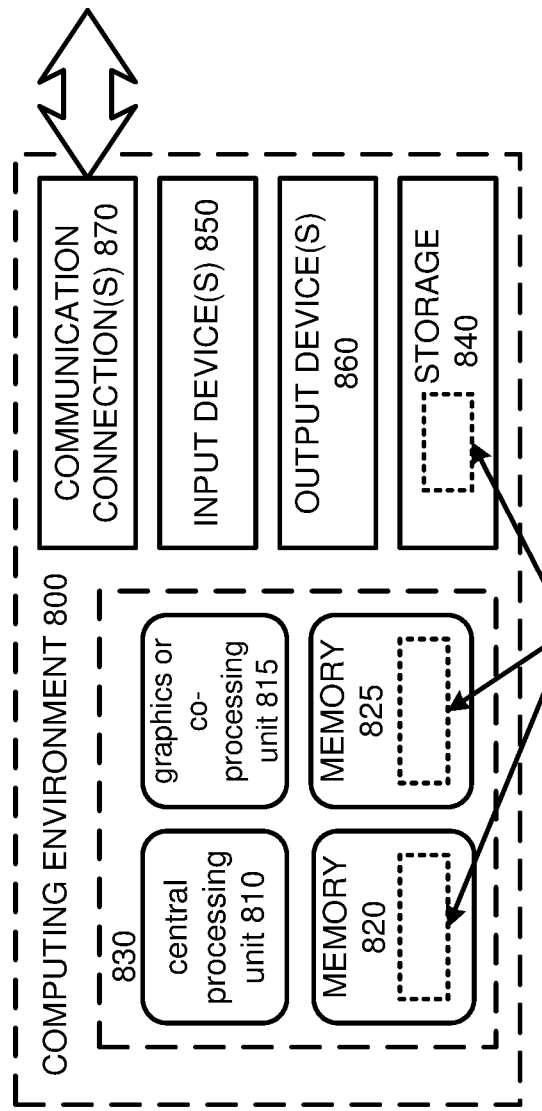
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of routing network traffic in a multi-tiered Clos-based network, the method comprising:

receiving the network traffic in a first tier of the multi-tiered Clos-based network, wherein each tier of the multi-tiered Clos-based network includes network devices coupled to an adjacent tier;

splitting the network traffic as the network traffic is transmitted from the first tier to a higher-level tier in the multi-tiered Clos-based network;

monitoring how the network traffic is split as the network traffic is transmitted between the tiers in the multi-tiered Clos-based network;

calculating forwarding tables in each of the network devices based on how the network traffic is split; and programming the forwarding tables in the network devices based on the calculation.

2. The method of claim 1, wherein the monitoring of how the network traffic is split includes determining an amount of splitting for the multi-tiered Clos-based network.

3. The method of claim 1, wherein the splitting occurs as the network traffic is transmitted from the first tier to the higher-level tier and wherein the splitting is equal between the network devices on a tier.

4. The method of claim 1, wherein the calculating of the forwarding tables includes using a number of network devices in at least one of the tiers and a number of tiers in the multi-tiered Clos-based network.

5. The method of claim 1, wherein the programming of the forwarding tables includes programming the network devices in a tier with different respective forwarding tables.

6. The method of claim 1, wherein the calculating of the forwarding tables includes using the splitting to obtain a Weighted Equal-Cost Multi-Path (WECMP) result, but the programming of the network devices uses Equal-Cost Multi-Path routing.

7. A method of routing network traffic, the method comprising:
- programming network devices in a multi-tiered Clos network to split the network traffic as the network traffic is transmitted from a first tier in the multi-tiered Clos network towards a top tier in the multi-tiered Clos network;
- programming the network devices at the top tier to transmit the network traffic towards a lower tier in the multi-tiered Clos network;
- calculating forwarding tables for the network devices in a tier as a function of how the network traffic is split; and
- programming the network devices with the calculated forwarding tables.

8. The method of claim 7, wherein the calculating of the forwarding tables is further a function of a number of tiers in the multi-tiered Clos network.

9. The method of claim 7, wherein the calculating of the forwarding tables is further a function of a number of network devices in the tier.

10. The method of claim 7, further including monitoring the network devices to determine how the network traffic is split and using the monitored split in the calculating of the forwarding tables.

11. The method of claim 7, wherein the multi-tiered Clos network includes at least two tiers.

12. The method of claim 7, wherein the lower tier is the first tier through which the network traffic was transmitted.

13. The method of claim 7, wherein the calculating of the forwarding tables includes using the splitting to obtain a Weighted Equal-Cost Multi-Path (WECMP) result, but the programming of the network devices uses Equal-Cost Multi-Path routing.

14. The method of claim 7, wherein the splitting of the network traffic is performed in statistically equal shares to each network device in a higher tier.

15. A system, comprising:
- a Clos network including multiple tiers of network devices interconnected with each network device in a tier being coupled with each other network device in an adjacent tier; and
- a server computer coupled to the Clos network for monitoring an amount of splitting of the network traffic between tiers of the multiple tiers, wherein the server computer is configured to calculate forwarding tables of the network devices based on the amount of splitting of network traffic.

16. The system of claim 15, wherein the server computer is further configured to program the network devices based upon a number of network devices within a tier.

17. The system of claim 16, wherein the calculating of the forwarding tables includes using the splitting to obtain a Weighted Equal-Cost Multi-Path (WECMP) result, but the programming of the network devices uses Equal-Cost Multi-Path routing.

18. The system of claim 15, wherein the network devices are network routers or switches.

19. The system of claim 15, wherein the server computer calculates the forwarding tables for some of the network switches in a tier differently from other network switches in a same tier.

* * * * *